US008286518B2

(12) United States Patent
Bochen

(10) Patent No.: US 8,286,518 B2
(45) Date of Patent: Oct. 16, 2012

(54) DRIVE DEVICE

(75) Inventor: Marian Bochen, Eitelborn (DE)

(73) Assignee: Stabilus GmbH, Koblenz (DE)

( * ) Notice: Subject to any disclaimer, the term of this patent is extended or adjusted under 35 U.S.C. 154(b) by 777 days.

(21) Appl. No.: 12/315,588

(22) Filed: Dec. 4, 2008

(65) Prior Publication Data

US 2009/0145036 A1 Jun. 11, 2009

(30) Foreign Application Priority Data

Dec. 11, 2007 (DE) ......................... 10 2007 059 564

(51) Int. Cl.
*F16H 3/06* (2006.01)

(52) U.S. Cl. ........................................ 74/89.23; 49/340

(58) Field of Classification Search ................. 74/89.23, 74/89.32, 89.33, 89.34, 89.36, 89.37; 49/324, 49/339, 340, 356
See application file for complete search history.

(56) References Cited

U.S. PATENT DOCUMENTS 2,387,800 A * 10/1945 Leland et al. ................... 318/14
5,187,993 A * 2/1993 Nicholson et al. ........... 74/89.38
5,644,869 A 7/1997 Buchanan, Jr.
5,983,743 A * 11/1999 McGregor et al. ........... 74/89.23
6,240,678 B1 * 6/2001 Spether ........................... 53/317
6,516,567 B1 * 2/2003 Stone et al. ...................... 49/343
7,806,244 B2 * 10/2010 Bochen et al. ................ 188/266
7,900,530 B2 * 3/2011 Bochen et al. ............... 74/89.23
2005/0022453 A1 * 2/2005 Bosio .............................. 49/343
2006/0081078 A1 * 4/2006 Nagai et al. .................. 74/89.23
2007/0062119 A1 3/2007 Ritter
2008/0060273 A1 * 3/2008 Bochen et al. .................. 49/340
2008/0060463 A1 * 3/2008 Bochen et al. ............. 74/424.76
2008/0061643 A1 * 3/2008 Bochen et al. .................. 310/78
2008/0216409 A1 * 9/2008 Bochen et al. .................. 49/340
2008/0245631 A1 * 10/2008 Bochen et al. ................ 188/313
2009/0020005 A1 * 1/2009 Bochen et al. ..................... 92/23
2009/0120003 A1 * 5/2009 Bochen et al. .................. 49/340
2009/0178554 A1 * 7/2009 Bochen et al. .................. 92/145
2009/0320627 A1 * 12/2009 Bochen et al. ............... 74/89.23
2010/0037527 A1 * 2/2010 Bochen ........................... 49/341
2011/0068721 A1 * 3/2011 Bochen ......................... 318/379

FOREIGN PATENT DOCUMENTS

DE 696 31 776 T2 7/2004
DE 10 2005 030 052 A1 12/2006

* cited by examiner

*Primary Examiner* — Michael P Ferguson
*Assistant Examiner* — Daniel Wiley
(74) *Attorney, Agent, or Firm* — Cozen O'Connor

(57) ABSTRACT

A drive device for a lid of a motor vehicle includes a first fastening element connectable to a stationary component or to a movable component, and a housing tube located at the end of the drive device opposite the first fastening element and is free to move axially relative thereto. The housing tube includes, at the end opposite the first fastening element, a second fastening element connectable to the movable component or to the stationary component. A spindle drive including a threaded spindle and a spindle nut mounted on the threaded spindle is actuatable by a rotary device to move the first fastening element and the housing tube axially relative to each other. A stroke position of the first fastening element can be detected by a magnetic field sensor which senses longitudinal movements of a permanent magnet of the spindle along a sensitivity area of the stationary magnetic field sensor.

17 Claims, 2 Drawing Sheets

DRIVE DEVICE

BACKGROUND OF THE INVENTION

1. Field of the Invention

The invention pertains to a drive device, for a lid of a motor vehicle, with a first fastening element, which can be connected to a stationary component or to a movable component, and a housing tube, located at the end of the device opposite the fastening element and is free to move axially relative to that element. The housing tube comprising, at the end opposite the first fastening element, a second fastening element attachable to the movable component or to the stationary component, with a spindle drive comprising a threaded spindle and a spindle nut mounted on the threaded spindle, by means of which the first fastening element and the housing tube can be moved axially relative to each other, where the spindle drive can be rotated by a rotary drive, and the stroke position of the first fastening element can be detected by a sensor.

2. Description of the Related Art

In a drive device, it is known that a linear potentiometer can be used to detect the stroke position and that a Hall sensor can be used to detect the rotations of the spindle. This implementation requires a large amount of space and has a complicated design.

SUMMARY OF THE INVENTION

An object of the invention is to create a drive device of the type having a compact and simple design.

According to one embodiment of the invention the threaded spindle can drive a permanent magnet in the longitudinal direction of the spindle along the sensitivity area of a stationary magnetic field sensor. This implementation for detecting the stroke position makes it possible for the currently assumed stroke position of the drive device to be detected even after an interruption of the power supply. The stroke position is detected without contact and thus without wear, which means that almost no maintenance is required.

Magnetic field sensors are to be understood as any sensor which converts a variable dependent on magnetic field strength or on magnetic induction into an electrical variable, where the variable dependent on magnetic field strength or on magnetic induction can be, for example, an induced voltage or a Hall effect.

The magnetic field sensor preferably provides high sensitivity and transmits strong output signals, and is preferably an MR (magnetoresistive) sensor, which offers a high level of accuracy of the position detection.

A permanent magnet is mounted on a nonrotating, internally threaded ring, the internal thread of which engages in the external thread of the threaded spindle. The internally threaded ring is preferably the spindle nut.

To reduce the distance to be detected by the MR sensor, typically, the distance that the permanent magnet travels versus the distance traveled by the spindle nut, a cylindrical, externally threaded part is permanently mounted on the threaded spindle. The externally threaded part has a thread having a finer pitch than the thread of the threaded spindle. The thread of a ring-like, internally threaded part engages in the thread of the externally threaded part and carries the permanent magnet. Thus it is possible to reduce the size of the drive device.

In one embodiment, the threads of the externally threaded part and of the internally threaded part are fine-pitch threads.

To prevent the internally threaded part from turning but still allow it to move in the axial direction, the internally threaded part and/or the permanent magnet engage in the radially outward direction in a stationary linear guide groove or a stationary linear guide slot extending in the axial direction of the threaded spindle. The groove or slot preferably extending at least approximately over the entire length of the externally threaded part.

To simplify production, the linear guide groove or the linear guide slot is formed in a permanently mounted, ring-like linear guide part.

In one embodiment the magnetic field sensor is preferably mounted on the radially outer side of the linear guide groove or linear guide slot and thus near the path of movement of the permanent magnet.

A compact design is obtained by mounting the rotary drive inside the housing tube.

The rotary drive is preferably an electric motor, the output shaft of which is able to rotate the threaded spindle.

To reduce the rpm's and to increase the torque, the threaded spindle is rotated by a gear unit, where the installation of the gear unit inside the housing tube again leads to a compact design.

To support the outward movement out of the housing tube, the first fastening element is subjected to an elastic force acting in the outward direction. In one embodiment, the first fastening element is acted upon by a compression spring, preferably a helical compression spring, which is supported on the housing tube. To save space, the spring can loosely surround the threaded spindle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

An exemplary embodiment of the invention is illustrated in the drawing and is described in greater detail below.

DETAILED DESCRIPTION OF THE PRESENTLY PREFERRED EMBODIMENTS

Figure 1:
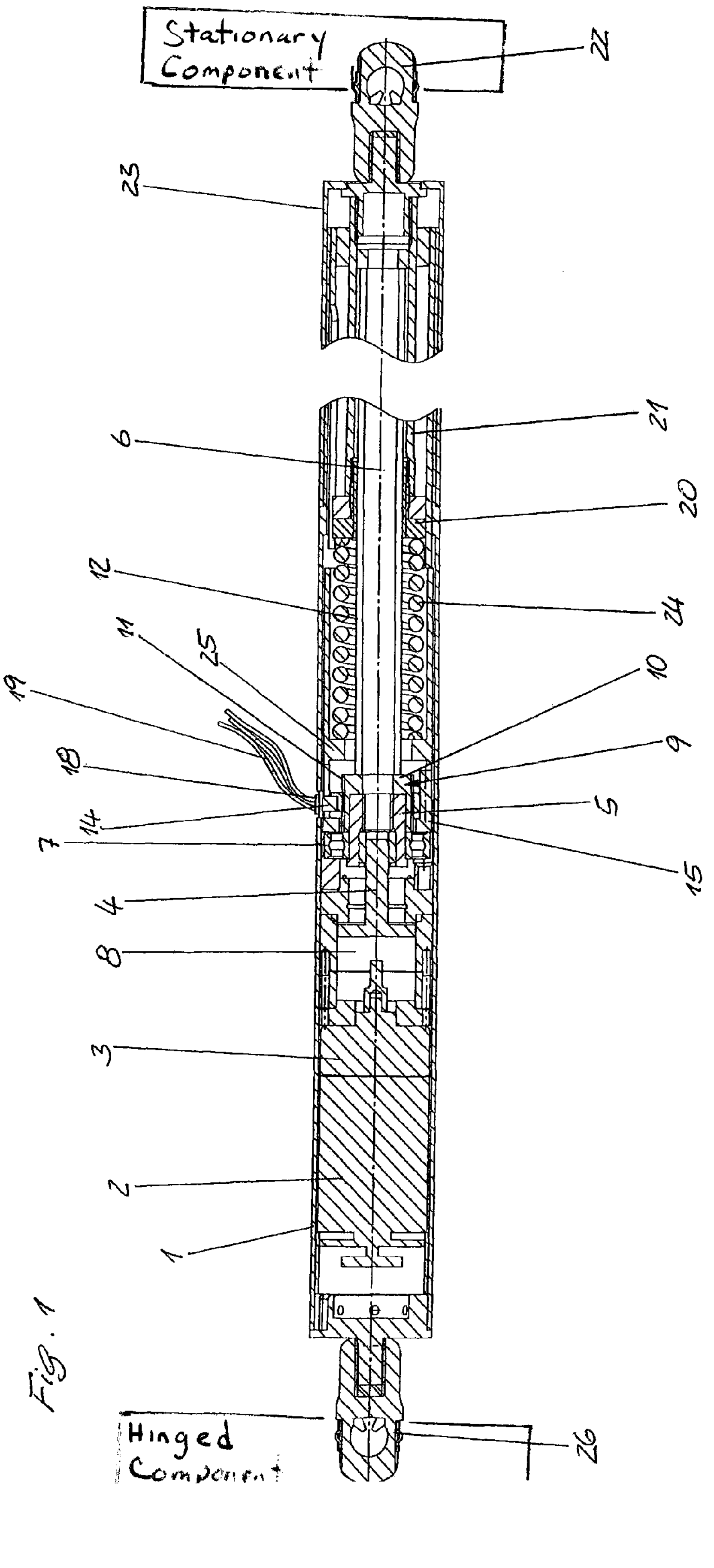
FIG. 1 is a longitudinal cross section of a drive device.

The drive device shown here has a housing tube 1, closed by a bottom piece at one end. Inside the tube, an electric motor 2 and a gear unit 3 also known as reducing gear are installed in series. The motor drives the gear unit. An output shaft 4 of the gear is able to rotate a threaded spindle 6 by way of a motor bushing 8 and a spindle bushing 5.

A second fastening element 26 designed as a ball socket is mounted on the bottom of the housing tube 1.

The axially stationary spindle bushing 5 is supported with freedom to turn in the housing tube 1 by a roller bearing 7.

The spindle bushing 5 projects into the opening of a cup-like, externally threaded ring 9, the bottom part 10 of which is permanently connected to the threaded spindle 6.

The external, thread ring is provided on its cylindrical lateral surface with a fine thread 11, the pitch of which is finer than that of the thread 12 of the threaded spindle 6.

Figure 2:
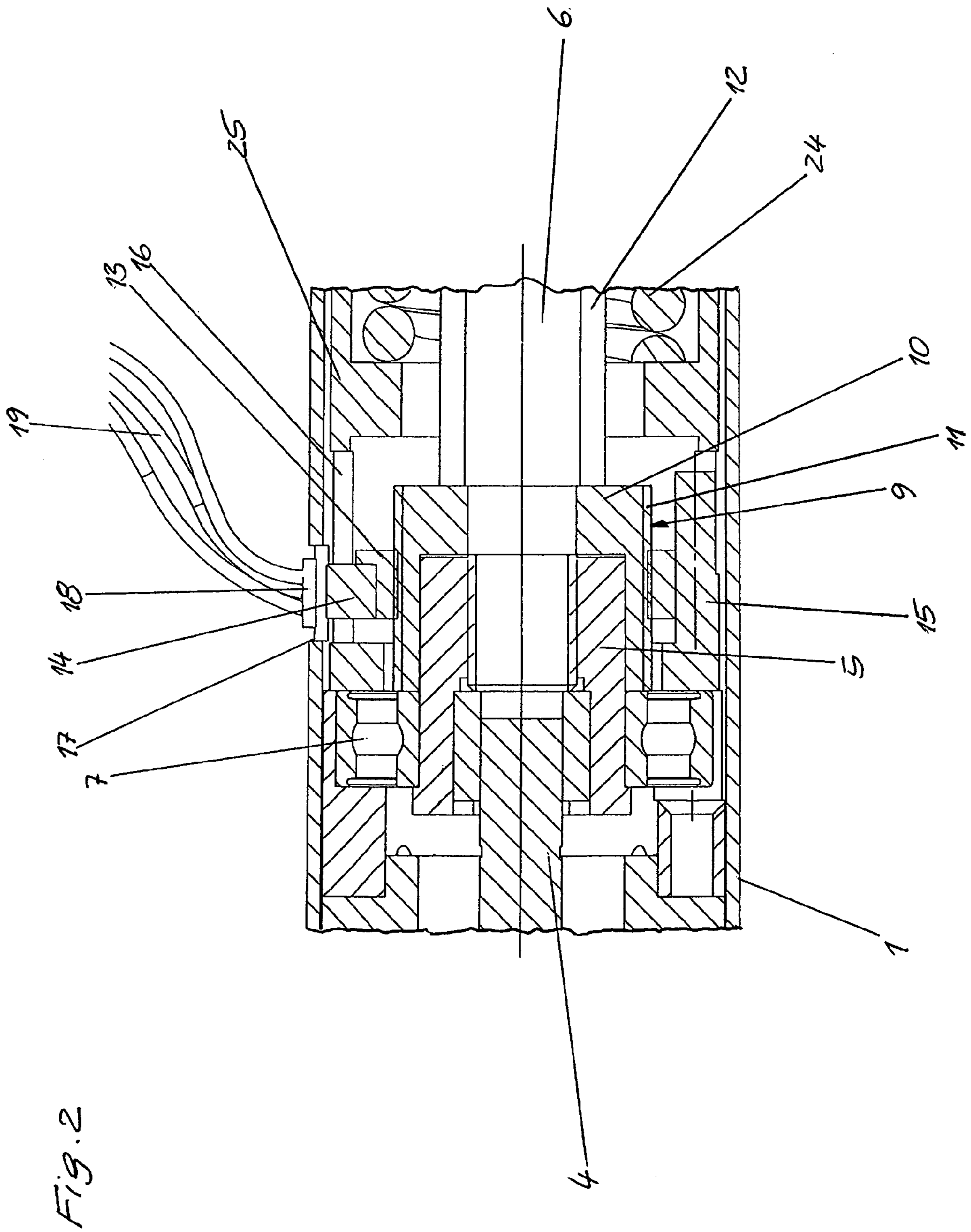
FIG. 2 is an enlarged view of part of the drive device of FIG. 1.

The corresponding thread of an internally threaded part 13 (FIG. 2) of much shorter axial length than the externally threaded ring 9 engages in the fine thread 11 of the externally threaded ring 9. This short part carries a radially outward-projecting permanent magnet 14

The internally threaded part 13 is surrounded in turn a certain radial distance away by a sleeve-like linear guide slot 15, which extends over the entire length of the externally threaded ring 9, and the outer lateral surface of which fits tightly in the housing tube 1.

The permanent magnet 14 projects radially outward through a linear guide slot 15, which is formed in the linear guide part 16, and which extends in the axial direction with respect to the threaded spindle 6. The internally threaded part 13 is thus prevented from twisting.

An MR sensor 18 is arranged in an opening 17 of the housing tube 1 in the area of the externally threaded part 9. The permanent magnet 14 can be moved axially along this sensor, i.e., along its sensitivity area, by the rotation of the threaded spindle 6 and thus also of the externally threaded part 9.

The MR sensor 18 generates an output signal in corresponding to the axial position of the internally threaded part 13 on the externally threaded part 9 and thus in corresponding to the position of the permanent magnet 14. This signal can be sent to an electrical or electronic unit (not shown) over a cable connection 19.

The path of the permanent magnet 14 detected by the MR sensor 18 corresponds approximately to the path of a spindle nut 20, which is mounted on the threaded spindle 6 so that it is free to move in the axial direction but is not free to turn.

Inside the housing tube 1, a spindle tube 21, which surrounds the threaded spindle 6, is provided on the spindle nut 20. The end of the tube facing away from the electric motor 2 extends out of the housing tube 1 and carries a first fastening element 22, which is designed as a ball socket.

One end of a protective tube 23 is connected to the spindle tube 21 in the area of the first fastening element 22 and encloses in a telescoping manner the end area of the housing tube 1 facing the first fastening element 22.

In the end area of the threaded spindle near the externally threaded part 9, the spindle is loosely surrounded radially by a preferably pretensioned helical compression spring 24. One end of the spring rests against a stop 25 connected permanently to the housing tube 1, whereas the other end acts on the spindle nut 20 in the outward-travel direction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A drive device coupled between a stationary component and a hinged movable component, the drive device comprising:

- a first fastening element connectable to one of the stationary component and the hinged movable component;
- a housing tube, the housing tube configured to be axially moveable relative to the first fastening element;
- a second fastening element attached to the housing tube at an end opposite the first fastening element, the second fastening element being connectable to the other of the stationary component and the hinged movable component;
- a spindle drive mounted in the housing tube, the spindle drive comprising:
- a threaded spindle having an external thread; and
- a spindle nut mounted on the threaded spindle and coupled to the first fastening element,
- wherein the spindle drive is configured to move the first fastening element and the housing tube axially relative to each other via the spindle nut;
- a rotary drive configured to rotate the spindle;
- a stationary magnetic field sensor coupled to the housing tube for detecting a stroke position of the first fastening element;
- a cylindrical externally threaded part mounted on the threaded spindle, the thread of the cylindrical externally threaded part being of a finer pitch than the thread of the threaded spindle; and
- a circular internally threaded part, wherein the thread of the internally threaded part engages the thread of the cylindrical externally threaded part;
- a permanent magnet coupled to the cylindrical internally threaded part for movement in a longitudinal direction,
- wherein rotation of the threaded spindle moves the permanent magnet along a sensing area of the stationary magnetic field sensor.

2. The drive device according to claim 1, wherein the magnetic field sensor is a magnetoresistive sensor.

3. The drive device according to claim 1, wherein the permanent magnet is nonrotatably mounted on the circular internally threaded part.

4. The drive device according to claim 1, wherein the threads of the externally threaded part and of the internally threaded part are the same.

5. The drive device according to claim 1, wherein at least one of the internally threaded part and the permanent magnet is engaged in a stationary linear guide extending axially with respect to the threaded spindle.

6. The drive device according to claim 5, wherein the stationary linear guide is formed in a circular linear guide part.

7. The drive device according to claim 5, wherein the magnetic field sensor is coupled to a radially outer side of the stationary linear guide.

8. The drive device according to claim 5, wherein the stationary linear guide extends substantially over a length of the externally threaded part.

9. The drive device according to claim 1, wherein the rotary drive is installed inside the housing tube.

10. The drive device according to claim 9, wherein the rotary drive is an electric motor having an output shaft adapted to rotate the threaded spindle.

11. The drive device according to one claim 10, wherein the rotary drive is coupled to the threaded spindle via a gear unit.

12. The drive device according to claim 11, wherein the gear unit is installed inside the housing tube.

13. The drive device according claim 1, wherein the first fastening element is subjected to an elastic force acting in a direction away from the housing tube.

14. The drive device according to claim 1, wherein the first fastening element is subjected to an elastic force of a compression spring supported by the housing tube.

15. The drive device according to claim 14, wherein the compression spring surrounds the threaded spindle.

16. The drive device according to claim 14, wherein the compression spring, is a helical compression spring.

17. The drive device according to claim 16, wherein the helical compression spring surrounds the threaded spindle.

* * * * *